[11] 3,624,711

[72] Inventor Milton F. Zei
Bellevue, Wash.
[21] Appl. No. 846,191
[22] Filed July 30, 1969
[45] Patented Nov. 30, 1971
[73] Assignee Automation Industries, Inc.
Century City, Calif.

[54] MATERIAL TESTER
29 Claims, 12 Drawing Figs.
[52] U.S. Cl.................................................. 73/67.7,
310/8.3, 73/71.5
[51] Int. Cl....................................... G01n 29/00
[50] Field of Search............................ 73/67.2,
67.3, 67.4, 67.5, 67.6, 67.7, 67.8, 67.9, 71.5

[56] References Cited
UNITED STATES PATENTS

| | | | |
|---|---|---|---|
| 2,320,390 | 6/1943 | Shmurak................... | 73/52 |
| 3,453,872 | 7/1969 | Botsco...................... | 73/69 |
| 2,403,999 | 7/1946 | Read et al................. | 73/67.2 |
| 2,448,352 | 8/1948 | Carlin....................... | 73/71.5 X |
| 3,242,723 | 3/1966 | Evans....................... | 73/71.5 |
| 3,427,866 | 2/1969 | Weighart................... | 73/67.7 |
| 3,503,252 | 3/1970 | Miller....................... | 73/71.5 |

*Primary Examiner*—Richard C. Queisser
*Assistant Examiner*—Arthur E. Korkosz
*Attorney*—Dan R. Sadler

ABSTRACT: A combination acoustical eddy current search unit is described for use in an ultrasonic nondestructive test instrument. The eddy current transducer of the search unit provides vibrational projections into a workpiece under test and the acoustical transducer of the search unit detects the acoustical vibrations and any change in mode thereof.

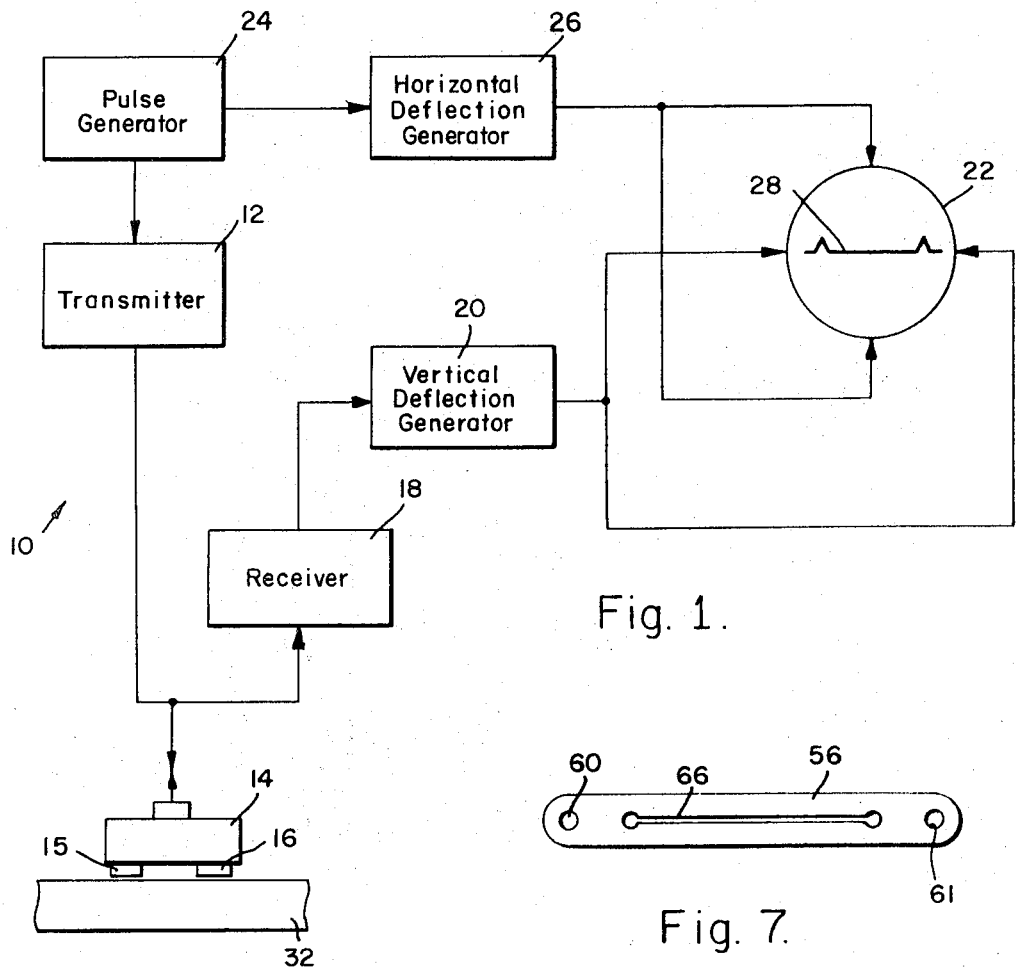
Fig. 1.
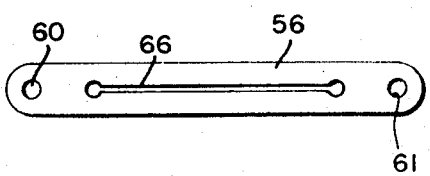
Fig. 7.
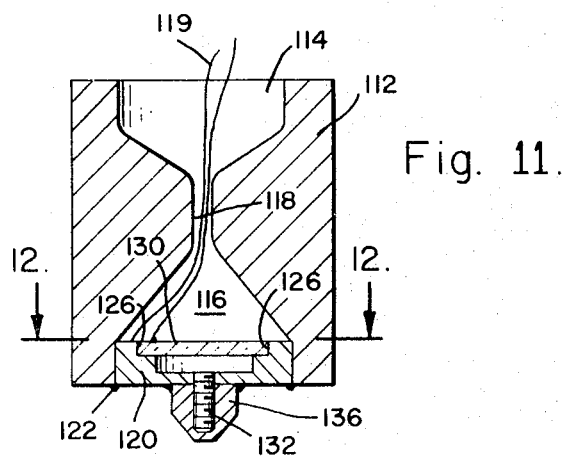
Fig. 11.
Milton F. Zeutschel,
INVENTOR.
BY.
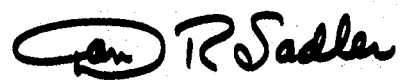
ATTORNEY.

Milton F. Zeutschel,
INVENTOR.

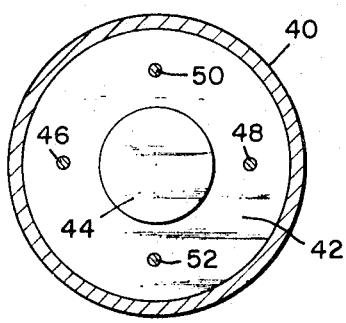
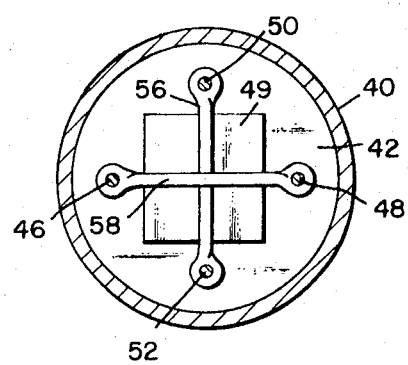
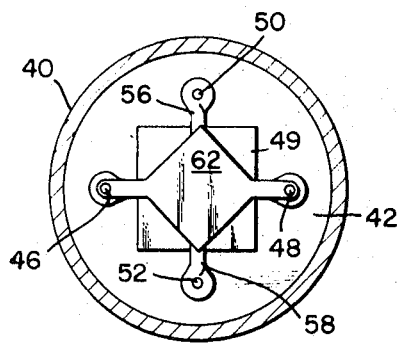
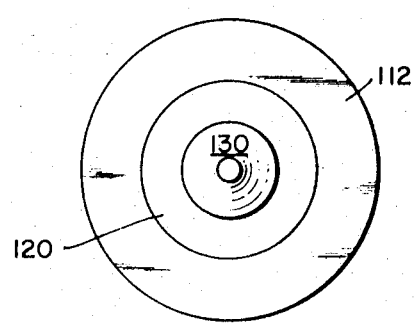
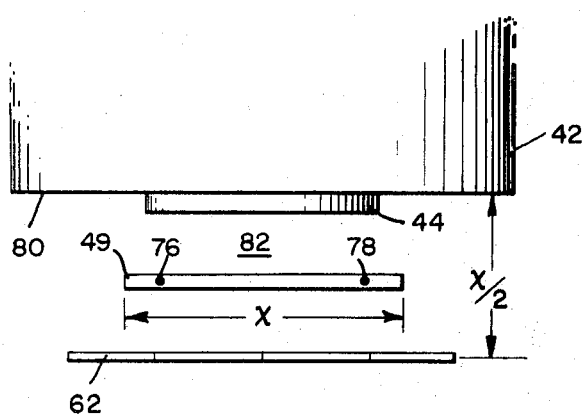

3,624,711

MATERIAL TESTER

BACKGROUND OF THE INVENTION

1. Field of the Invention

This invention relates to material testers and more particularly to a novel and improved noncontact-type air-coupled transducer useful in the inspection of workpieces.

2. Description of the Prior Art

In the prior art there is provided electrical nondestructive test equipment which generates ultrasonic vibrations by use of crystal transducers. The vibrations for the transducer are then sent in the form of an acoustical pulse beam into the workpiece being tested. The beam travels unimpeded through large metallic parts and reflects back from the end surfaces thereof. Any flaw, defect or other discontinuity in the workpiece also causes reflections of the acoustical beam back to the instrument which indicates the location and size of the discontinuity on a display such as an oscilloscope. The search unit need only have access to one side of the workpiece being tested. The vibrations are projected from the search unit into the workpiece. A portion of the pulse is reflected back by the flaw or defect and the balance is reflected from the end surfaces. The return energy is displayed on the oscilloscope as vertical spikes. The screen on the oscilloscope exhibits electrical waveforms in the form of spikes of the initial pulse, the defect, and the back and front surface reflections. Spacing of the spike on the scope is in proportion to the distance the beam traveled in the material tested, thus locating position of any flaw by irregular spaced spikes.

Also, such a tester is used to determine the thickness of the workpiece by the regularity of the return back and front surface spikes. If any discrepancies appear in the thickness, it is detected by the relative change in the spikes displayed on the scope.

In these prior art devices, the need for a couplant between the search unit and the workpiece is ever present, due to the fact that ultrasonic energy is greatly attenuated when transmitted through an air medium. This is especially true when using a high frequency required in the proper operation of the prior arts nondestructive testers. Generally the transducers, search units and the workpieces to be tested are immersed into a tank of water in some instances. The search unit then being coupled to the workpiece by the water medium and the search unit is scanned across the workpiece searching for the defects.

Other prior art devices include a water path between the search unit and the workpiece, whereby a steady stream of water couples the sound waves into the workpieces. Yet other types of couplants include the use of glycerin or the like which is first spread across the surface of the workpiece. The search unit is then coupled into the workpiece through this glycerin medium.

All of the above means of coupling the search unit to the workpiece have obvious disadvantages. The water tank medium and the water path devices are difficult and inconvenient to handle, while the glycerin paste technique requires a considerable cleanup after each test. Thus a need is provided for sending sound vibrations to the workpiece by an improved contact search unit which is physically coupled to the workpiece and without the use of any intermediant couplant for the ultrasonic energy.

In some prior art devices, physical coupling of the search unit to the workpiece is attempted. This technique has not been found very accurate, since the coupling of the acoustic vibration into the workpiece varies with the contact pressure and alignment of the transducer. Thus, if the pressure varies, the output signal or return signals picked up by the search unit will vary and present a false alarm of some sort into the search unit and the test equipment used therewith. This false alarm could be interpreted as a flaw or defect in a workpiece which is free of defects. Yet on the other hand the contact pressure may not be heavy enough and a flaw may be overlooked.

Thus a need has arisen for a transducer search unit which has the capabilities of sending sound vibrations through the workpiece with very limited physical contact of the search unit on the workpiece or without the submersion of the workpiece and search unit into a tank of couplant. This need is for a device which can be virtually air coupled in some instances to the workpiece and yet be capable of transmitting sounds sufficient to detect flaws or other discontinuities within the workpiece.

SUMMARY

Briefly described, the present embodiment comprises an ultrasonic material tester including a means for providing pulses of electrical energy and means for receiving pulses of electrical energy. A display means is provided for displaying signals received by said receiving means. A search unit is provided and is adapted to be coupled to the workpiece under test. The search unit includes a transmit and a receive transducer sometimes mounted in a single housing or support. At least one transducer is provided and includes means for vibrating the workpiece by inducing eddy currents therein. The other transducer includes an ultrasonic pickup transducer which is sensitive to the sounds of the vibrations of the workpiece.

The eddy currents induced into the workpiece cause it to vibrate in different modes depending upon the characteristics of the material. If there are no flaws, defects or other discontinuities in the workpiece, the signal received by the receive transducer will show a constant signal to the display means. Should, though, there be a defect in the workpiece, the physical vibration, and hence the physical movement of the workpiece will take on a different characteristic, causing the receive transducer to receive pulses therein either at a later or earlier time, depending upon the type of defect.

The search units provided in this embodiment have a basic advantage over the prior art in that they operate on a somewhat unique principle. First, there is never a need for a liquid couplant or any other type of couplant between the contactor and the workpiece. Secondly, the physical contact of the search units on the workpiece need only be light, thus preventing damage to the search unit, and also preventing scoring, scratching or otherwise damaging the workpiece.

DESCRIPTION OF THE DRAWINGS

These and other features and advantages will become more apparent to those skilled in the art when taken into consideration with the following detailed description, wherein like reference numerals indicate like and corresponding parts throughout the several views and wherein:

FIG. 1 is an electrical block diagram illustrating a nondestructive material tester in accordance with the principles of this invention;

FIG. 4 is a bottom view of the air coupled transducer of the search unit taken along the lines 4—4 of FIG. 2;

FIG. 5 is a section view of the air coupled transducer of the search unit taken along the lines 5—5 of FIG. 2;

FIG. 6 is a section view of the air-coupled transducer of the search unit taken along the lines 6—6 of FIG. 2;

FIG. 7 is a view illustrating the resilient retaining member used in the search unit shown in FIG. 2;

FIG. 8 is a semischematic section view of the elements of the search unit shown in FIG. 2;

FIG. 11 is a section view of the contact transducer taken along the lines 11—11 of FIG. 10; and FIG. 12 is a section view of the contact transducer taken along the lines 12—12 of FIG. 11.

DETAILED DESCRIPTION OF THE DRAWINGS

Figure 2:
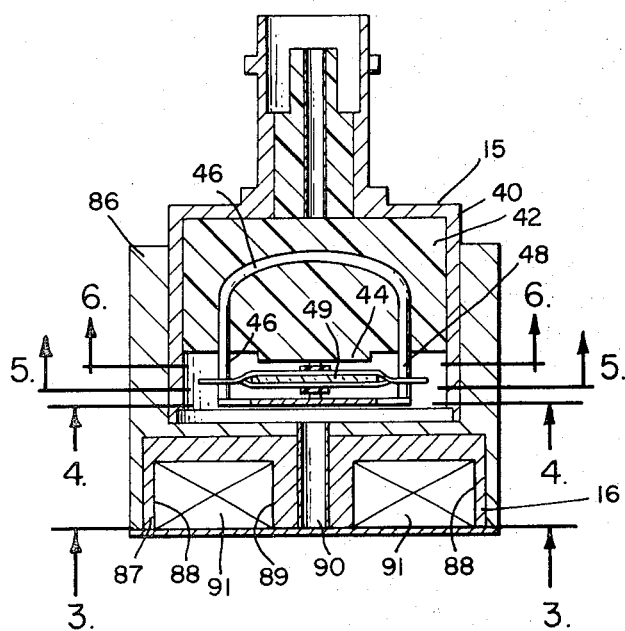
FIG. 2 is a side view of one embodiment of the search unit used with the material tester shown in FIG. 1.
Figure 3:
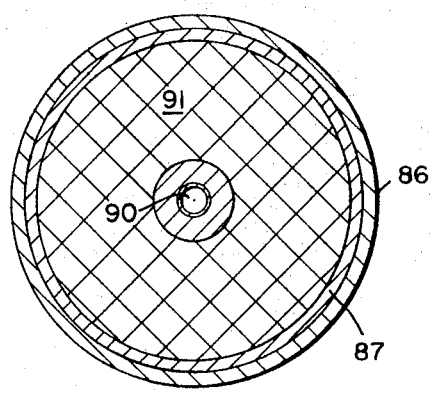
FIG. 3 is a bottom view of the eddy current transducer of the search unit taken along the lines 3—3 of FIG. 2.

Turning now to the drawing, there is shown a nondestructive test instrument 10, which includes a transmitter 12, which produces a series of intermittently occurring pulses. The transmitter 12 is coupled to a search unit 14, whereby pulses emitted by the transmitter 12 excite a transducer 15 in the search unit 14.

Vibrations from the pulses are received by another transducer 16 in the search unit through a workpiece 32 whereby a similar electrical signal is produced therefrom. This electrical signal is applied to a receiver 18 which in turn is coupled to a vertical deflection generator 20, and thence into the vertical deflection plates of a cathode-ray tube 22. The transmitter 12 is driven by pulse generator 24, which also drives a horizontal deflection generator 26, which in turn is coupled to the horizontal deflection plates of the cathode-ray tube 22.

The results of the signal received by the receiver 18 and the horizontal deflection generator 26 are displayed in a display 28 on the screen of the cathode ray tube 22. The screen of the oscilloscope 22 reflects the received energy in the form of spikes of the initial pulse. Also shown are spikes indicative of the defects and back reflections from the material under test. Arrival time of the spikes is in proportion of the thickness of the material tested. Also physical displacement in the time of arrival of the signal by the receiver indicate that a flaw or defect is present in the material.

In some instances the screen of the cathode-ray tube 22 reflects the return energy as a measure in the time for the ultrasonic energy to pass from the transmit transducer 15 to the receiver transducer 16. If a flaw or defect is detected in the material, the flight time increases or decreased depending upon the type of defect. Too, changes in thickness of the workpiece will be detected as a change in flight time of the ultrasonic energy and the position of the pulse spike on the scope as compared to a reference will be a measure of the thickness of the workpiece 32. A typical instrument for this invention is set forth in copending application Ser. No. 836,436, filed June 25, 1969, for a material tester on behalf of Milton F. Zeutschel and assigned to the assignee of this invention.

Referring now to FIG. 2, there is shown a dual transducer for the search unit 14. In this combination, the receive transducer 15 is positioned directly on top of the transmit transducer 16. The receive transducer 15 arrangement is an air coupled type and is set forth in copending patent application Ser. No. 36,295, filed June 25, 1969 for material tester on behalf of Milton F. Zeutschel and assigned to the assignee of this invention. The transducer 15 of search unit 14 comprises a housing 40 having an insert 42 positioned therein. The transducer housing 40 may be cylindrical in shape. The insert 42 therein may be comprised of an electrically acoustically nonconductive material such as plastic, epoxy or the like. Insert 42 has a cylindrical raised portion 44 (best shown in FIGS. 6 and 8) which protrudes from the insert 42 and generally towards the workpiece 32.

A U-shaped structure 46 is embedded into the insert 42 and provides two outwardly positioned pins 46 and 48. A pair of contact terminals 50 a 52 (as shown in FIG. 6) may be inserted into the insert 42 and lead out an opening in the top of the housing 40 to provide the electrical energy to be conducted to and from the receive transducer 15 of search unit 14. A transducer 49 in the form of a piezoelectric crystal is resiliently mounted to the posts 46, 48, 50 and 52 by a pair of resilient members 56 and 58 in the manner shown in FIG. 4.

With reference to the structure for mounting the transducer 49 to the insert 42, the mounting member 56 shown in FIG. 7 is comprised of a resilient material such as rubber. A pair of holes 60 and 61 are provided in each end thereof. The resilient member 56 is substantially elongated and has a slit 66 therein. One of the members 56 is stretched between the contact points 50 and 52 whereby the opening 60 is fastened over the post 52 and the opening 44 is fastened over the post 50.

The transducer 49 placed within the slit 66 in the resilient member 58 also connects to transducer 49 in the same manner and is positioned in the opposite direction across the transducer 49, coupled across the posts 50 and 52. The type of mounting provides complete freedom of movement of the transducer 49.

Turning now to FIG. 5 there is shown a reflector plate 62 which is mounted securely to the posts 46 and 48. In this embodiment the reflector plate is shown smaller in size than the transducer 49. In FIG. 8 there is shown a somewhat schematic illustration of the relative positioning of the insert 42, the elevated reflective surface 44, the crystal transducer 49, and the reflector 62. As is well known to those skilled in the at, the transducer 49 when excited with electrical energy will tend to vibrate in its thickness mode. For example, it will flex along its center axis. During this flexure it is known that two positions thereof, hereinafter referred to as the nodal points, remain stationary. These are illustrated in the drawings in FIG. 8, as points 76 and 78.

Ultrasonic energy received by the transducer search unit 14 and especially in low frequencies around the 25-kilohertz range is spread out in a rather large lobe. It is desirous to concentrate the pressure of this ultrasonic energy onto the transducer crystals 49 and preferably between the nodal points 76 and 78. Thus a restriction is effected between the transducer crystal 49 and the elevated surface 44 by the distance therebetween being relatively smaller. Ultrasonic energy which effectively does not impinge upon the crystal transducer per se will be reflected from the reflection surface 80 of the insert 42 and forced into the restrictive area 82 thus creating a higher pressure on the transducer crystal 49 and causing it to increase in vibrations, thus increasing the pickup energy received thereby.

As is well known, the resonant frequency of a crystal depends upon its physical shape. Thus, for example, a ⅜-inch crystal has a dimension shown as lambda in FIG. 8 may be considered to be one wavelength which is resonant at 25 kilohertz. In this embodiment the reflector is based on one-half wavelength, $\lambda/2$ from the reflective surface 80 to the reflector 62. In operation it is desirous to minimize standing waves which reflect from the surface of the workpiece 17. In order to eliminate the standing waves the signals reflected from the reflector 62 cancel out all reflections from the back surface 80 because they are 180° F. out of phase by virtue of the $\lambda/2$ spacing therebetween. These cancelled signals will not then impinge upon the crystal 49 and the only signals detected by the crystal 49 are those that are directly from the transmit transducer.

Referring back now to FIG. 2 the receiver transducer 16 hereinbefore described is positioned within an outer support 86. Near the bottom of this outer support 86 there is placed the transmit transducer 16. By the embodiment shown in FIG. 2 this transmit transducer comprises an insert 87 positioned into support 86 which has a hollow cylindrical portion 88. A hollow shaft 89 extends into the hollow portion 88. The portion 89 has an opening 90 that leads into the portion which communicates with the transducer 15. A coil of wire 91 is wound around the protruding shaft 89. The lead wires thereof lead through the top of the search unit 14 and are coupled into the transmitter 12. The coil of wire is normally secured within the housing 88 in a suitable manner, as for example encapsulating the coil in epoxy.

In operation the coils 91 of the transmit transducer 15 set up an eddy current field into the workpiece 32 which is detected by the search unit 15 through the opening 90. A basic advantage of this type of search unit is that the transmit and receive transducers need not be in intimate contact with the workpiece 32 in order to create the necessary vibrations therein to be detected by the receiver transducer 15.

Figure 9:
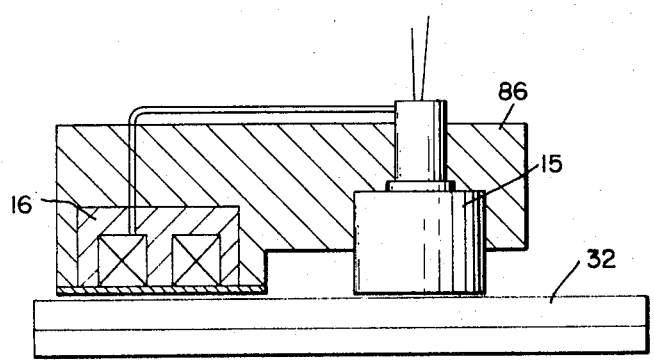
FIG. 9 is a view of the eddy current transducer and the air-coupled transducer in a different embodiment.

FIG. 9 illustrates an embodiment in accordance with the principles of this invention whereby the transmit transducer 16 and the receive transducer 15 are positioned in a side by side relationship. In this embodiment the support 86 positions the two transducers a fixed distance from one another. In so doing the vibrations from the transmit transducer 16 arrive at the receive transducer 15 at a fixed time depending upon the characteristics of the workpiece 32. Flaws, voids or other discontinuities will change the time of arrival and will be reflected accordingly on the screen of the cathode ray tube 27.

The search unit 14 as shown in FIG. 9 comprises a support or mount 102 which has a transmit transducer 16 and a receive transducer 15. The transmit transducer is an eddy current type heretofore described. The receive transducer 15 comprises a contact type. A cable 108 is coupled into the search unit 14 and through the support 102, and couples into the transducers 15 and 16. The contact-type transducer 104 of the search unit 100 is in physical contact with the workpiece 32. The support 102 maintains the transducers 15 and 16 a fixed distance from one another. The contact transducer 15 may be the type set forth in copending patent application Ser. No. 836,002 filed June 24, 1969 on behalf of Milton F. Zeutschel and assigned to the assignee of this invention.

Referring to FIGS. 11 and 12, there is shown a typical contact transducer 104 which is comprised of a relatively dense material such as brass or the like, and has an opening portion 114 in one end thereof, and an opening 116 in the other end thereof. A hole 118 is drilled between the openings 114 and 116 to allow the lead wires 119 to pass therethrough. An insert 120 is tightly secured into the opening 116 and may be secured in place by an epoxy at the areas 122 as shown in FIG. 11.

The insert 120 has a center diaphragm portion 124 whereby the insert is relatively thin in the diaphragm area 124. The insert 120 has a ledged portion 126 around the peripheral edge of the diaphragm 124. For best results the insert 120 is comprised of a lucite or the like, or some material with good tensile properties. The density of the material of the insert 120 may be of some importance in that the heavier the mass, the lower the frequency of the vibration of the diaphragm area 124.

A piezoelectric crystal 130 which may be cylindrically shaped as shown in FIG. 12 is tightly secured to the ledges 126 of the insert 120. The piezoelectric crystal 130 is coupled to the wires 118 whereby the transmitter 12 of FIG. 1 will transmit the electrical pulses to the crystal 130, causing it to vibrate in a mechanical motion. As is well known, most piezoelectric crystals will vibrate in their thickness mode. In some instances though, the material in the transducer 130 may be selected from the type which vibrates in the radial mode, although it should not be limited to this type of material. When the pulses from the transmitter 12 are applied through the wires 118 to the transducer 130, it causes it to vibrate in this radial mode. This in turn causes the diaphragm 124 to vibrate in the axial mode by virtue of the fact that the transducer 130 is securely adhered to the insert 120. The mechanical motion is then transmitted through the insert 120, causing the diaphragm area 124 to vibrate.

A threaded member such as a screw 132 protrudes from the center of the diaphragm area 124. A contactor member 136 is screwed thereon. The contacting member 136 may be cylindrical in shape and may come to a somewhat rounded point. The vibrational movement caused by the transducer 130 is then transferred through the diaphragm 124 onto the contactor 136. As shown in FIG. 5, the contact member 136 of transducer 16 is physical communication with the front surface of the workpiece 32.

Figure 10:
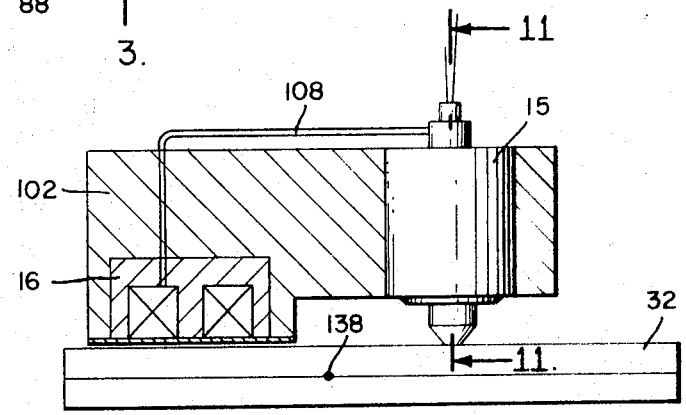
FIG. 10 is a view of one of the contact transducer type search units.

In operation the workpiece 32 is vibrated by the eddy current field set up by the transducer 16 whereby the workpiece takes on physical distortions. If there are no flaws, defects or other discontinuities in the workpiece 110, the signal received by the receive contact member 136 will show a constant signal on display 28 into the cathode-ray tube 22 of FIG. 1. Should, though, there be a defect, as for example a void 138 as shown in FIG. 10, the physical vibration, hence the physical movement of the workpiece will take on a different characteristic, causing the receive transducer 15 to receive pulse signals therein in a later or earlier time depending upon the type of defect. This will be related back to the electronic circuitry 10 in a manner previously described by the signal being received at different times and thus reflected directly to the cathode-ray tube 22. The contactor 136 can be easily removed from the threaded member 132 and a new contact member can be replaced therewith. This is highly desirable if a contactor 136 receives a considerable amount of use and the rounded portions thereon become worn.

The search units described herein have a basic advantage in that they operate on a somewhat unique principle. First of all there is no need for a liquid couplant or any other type of couplant between the search units 14 and the workpiece 32. Further, the search unit receive and transmit transducers do not depend wholly upon the ultrasonic energy being reflected through material and back to a second transducer as is now the case in the prior art devices. These particular search units 14 depend wholly upon the physical vibration of the workpiece and detect changes in the vibrational modes thereof. A material tester employing these principles is highly adapted to be used in honeycomb material, particle board, or plywood structures. Any changes in the density that cause the physical vibrations to change in any manner will be reflected to the receive transducer 15.

Another example of the utility of this transducer is that some honeycomb materials have definite characteristics. These characteristics in structure comprise skirts on the vertical structure which are all facing the same direction. It is sometimes desirable to know the exact direction of the skirts within the honeycomb structure. If the receive transducer 15 and the transmit transducer 16 are in one position in alignment with the skirts, a definite signal will be recognized in the output pattern. If the search unit 14 is positioned in a second direction, a change in the pattern is indicated. Thus, the direction of the skirts within the honeycomb structure can be easily determined.

Having thus described but preferred embodiments of this invention, what is claimed is:

1. An eddy current/ultrasonic search unit including:
   a support;
   a first transducer means mounted in said support for inducing eddy current fields into a workpiece; and
   a second transducer means including
   a relatively dense area having an opening in one end thereof;
   an insert physically mounted within the opening of said area and including a relatively thinner diaphragm portion in physical communication with said insert and for being coupled to said workpiece;
   a radial mode motion transducer being disposed in physical communication with said insert; and
   means for converting said axial mode motion of said diaphragm portion of said insert to radial mode motion in the transducer whereby axial mode motions of said diaphragm being communicated to said transducer.

2. The search unit as defined in claim 1 and wherein said first transducer includes a coil of wire.

3. A search unit including:
   a first transducer means including means for inducing eddy current fields into a workpiece; and
   a second transducer means being aligned with said first transducer means and being positioned a fixed distance therefrom and being adapted to detect acoustical vibrations of the workpiece caused by the eddy current fields, said second transducer including a housing, a back reflective surface being positioned in said housing, said back reflective surface having a protruding surface, and a transducer substantially disposed within said housing and over said protruding surface, said protruding surface being spaced between the nodal points of said protruding nodal points of said transducer.

4. The search unit as defined in claim 3 wherein said first transducer means including a coil of wire.

5. The search unit as defined in claim 3 wherein the transducer in said second transducer means being a piezoelectric crystal.

6. The search unit as defined in claim 3 wherein:
said first transducer means including a coil of wire; and
the transducer in said second transducer means being a piezoelectric crystal.

7. The search unit as defined in claim 3 and further including a second reflector being substantially disposed over the transducer in said second transducer means.

8. The search unit as defined in claim 7 wherein said second reflector being spaced substantially one-half wavelength from said back reflective surface.

9. The search unit as defined in claim 7 wherein said first transducer means including a coil of wire disposed in said housing and being adapted to be coupled in communication with said workpiece.

10. A search unit including:
a first transducer including means for introducing eddy current fields into a workpiece; and
a second transducer aligned with said first transducer means and positioned a fixed distance therefrom for detecting acoustical vibrations of the workpiece caused by the eddy current fields, said second transducer means including said second transducer including; a housing, an electrical and acoustical nonconductive insert disposed within said housing and including a protruding portion, mount pins positioned within insert and being disposed within said insert and being disposed on either side of said insert, and a piezoelectric crystal being resiliently mounted to said mount pins and over said protruding portion of said insert.

11. The search unit as defined in claim 10 and further including a reflector being mounted to said mount pins and substantially over said crystal.

12. The search unit as defined in claim 10 wherein the protruding surface being spaced between the nodal points of said second transducer.

13. The search unit as defined in claim 10 wherein said first transducer including a coil of wire.

14. A nondestructive material tester for inspecting a workpiece including:
first means for providing pulses of electrical energy;
second means for receiving pulses of electrical energy;
display means being responsive to said receiving means for displaying signals received thereby;
an ultrasonic search unit being adapted to be coupled to workpiece;
a first transducer means being disposed within said search unit and being responsive to said first means for inducing eddy current fields into said workpiece; and
a second transducer means being coupled to said second means and being disposed within said search unit for detecting changes in acoustical vibrations of said workpiece caused by the eddy current fields induced by said first transducer, said second transducer means including, a housing, a back reflective surface having a protruding surface, and a transducer being substantially disposed over said protruding surface wherein the protruding surface being spaced between the nodal points of said transducer.

15. The material tester as defined in claim 14 and further including a reflector being disposed over said transducer.

16. The material tester as defined in claim 14 and further including a reflector being disposed over said transducer and spaced substantially one-half wavelength from said back reflective surface.

17. The material tester as defined in claim 14 and wherein said first transducer means including a coil of wire and the transducer in said second transducer means being a piezoelectric crystal.

18. A nondestructive material tester for inspecting a workpiece including:
first means for providing pulses of electrical energy;
second means for receiving pulses of electrical energy;
display means being responsive to said receiving means for displaying signals received thereby;
an ultrasonic search unit being adapted to be coupled to the workpiece;
a first transducer means being disposed within said search unit and being responsive to said first means for inducing eddy current fields into said workpiece, and
a second transducer means being coupled to said second means and being disposed within said search unit for detecting changes in acoustical vibrations of said workpiece caused by the eddy current fields induced by said first transducer, said second transducer means including, a housing, a back reflective surface having a protruding surface, a transducer being substantially disposed over said protruding surface, and a reflector being substantially disposed over said transducer.

19. The material tester as defined in claim 18 wherein said reflector being spaced substantially one-half wavelength from said back reflective surface.

20. The material tester as defined in claim 18 and wherein said first transducer means including a coil of wire and the transducer in said second transducer means being a piezoelectric crystal.

21. An eddy current/ultrasonic search unit including:
a support;
a first transducer means mounted in said support for inducing eddy current fields into a workpiece; and
a second transducer means mounted in said support and including, a housing of relatively dense material having a hollow opening in at least one end thereof, an insert being shaped to be inserted into said housing and being in physical communication therewith, said insert including a ledge formed around the periphery thereof and protruding into the opening in said housing, a diaphragm having a flexible portion extending across one end of said insert and forming an integral portion of said insert, and a transducer crystal physically constructed to vibrate in the radial mode and being disposed across the ledge of said insert and into said housing and being in physical communication therewith whereby axial mode vibration of said diaphragm being converted to radial mode vibration and communicated to said crystal.

22. The search unit as defined in claim 21 wherein said first transducer means including a coil disposed within said support and being adapted to be in communication with said workpiece.

23. The search unit as defined in claim 21 and further including a contractor means being connected to the diaphragm portion of said insert in said second transducer means and being adapted to be positioned in physical communication with said workpiece.

24. The search unit as defined in claim 23 and wherein said first transducer means including a coil disposed within said support and being adapted to be in communication with said workpiece.

25. A nondestructive material tester for inspecting a workpiece comprising:
first means for providing pulses of electrical energy;
second means for receiving pulses of electrical energy;
display means responsive to said receiving means for displaying signals received thereby;
an ultrasonic search unit adapted to be coupled to the workpiece;
a first transducer means disposed within said search unit and being responsive to said first means for inducing eddy current fields into said workpiece; and
a second transducer means coupled to said second means and being disposed within said search unit for detecting changes in acoustical vibrations of said workpiece caused by the eddy current fields induced by said first transducer, said second transducer means including, a relatively dense area having an opening in one end thereof, an insert physically mounted within the opening of said housing and including a relatively thinner diaphragm portion in physical communication therewith, a radial mode motion transducer being disposed in physical communication with said insert whereby axial mode motions of said diaphragm being communicated to said radial mode transducer through said insert, and means for converting said axial mode motion of said diaphragm portion to radial mode motion of said radial mode transducer portion.

26. The tester as defined in claim 25 wherein said first transducer means including a coil coupled to said first means and adapted to be in communication with said workpiece.

27. The tester as defined in claim 25 and further including a contactor means being connected to the diaphragm portion of said insert in said second transducer means and being adapted to the positioned in physical communication with said workpiece.

28. The tester as defined in claim 27 and wherein said first transducer means including a coil coupled to said first means adapted to be in communication with said workpiece.

29. A nondestructive material tester for inspecting a workpiece comprising:

first means for providing pulses of electrical energy;
second means for receiving pulses of electrical energy;
display means responsive to said receiving means for displaying signals received thereby;
an ultrasonic search unit adapted to be coupled to the workpiece;
a first transducer means disposed within said search unit and being responsive to said first means for inducing eddy current fields into said workpiece; and
a second transducer means coupled to said second means and being disposed within said search unit for detecting changes in acoustical vibrations of said workpiece caused by the eddy current fields induced by said first transducer, said second transducer means including;
a member of relatively dense material having a hollow opening in at least one end thereof;
an insert being shaped to be inserted into said member and being in physical communication therewith, said insert including a ledge formed around the periphery of said insert and protruding into the opening in said member, a diaphragm having a flexible position extending across one end of said insert, and forming an integral portion of said insert; and
a transducer crystal physically constructed to vibrate in the radial mode and being disposed across the ledge of said insert and into said housing and being in physical communication therewith whereby vibrations of the diaphragm portion of said insert being converted to an axial mode vibration and communicated to said crystal.

* * * * *